Oct. 17, 1967

W. V. OPFER, JR 3,347,496

ENGINE AIR INLET SYSTEM FOR
SUPERSONIC V/STOL AIRCRAFT

Filed May 3, 1966

*INVENTOR.*
WALDO VIRGIL OPFER, JR.

BY

*Knox & Knox*

Oct. 17, 1967   W. V. OPFER, JR   3,347,496
ENGINE AIR INLET SYSTEM FOR
SUPERSONIC V/STOL AIRCRAFT
Filed May 3, 1966   2 Sheets-Sheet 2

INVENTOR.
WALDO VIRGIL OPFER, JR.
BY
Knox & Knox

United States Patent Office 3,347,496
Patented Oct. 17, 1967

3,347,496
ENGINE AIR INLET SYSTEM FOR SUPER-
SONIC V/STOL AIRCRAFT
Waldo V. Opfer, Jr., San Diego, Calif., assignor to The
Ryan Aeronautical Co., San Diego, Calif.
Filed May 3, 1966, Ser. No. 547,316
6 Claims. (Cl. 244—53)

ABSTRACT OF THE DISCLOSURE

In a supersonic jet aircraft capable of vertical take-off and landing, the engine air inlet duct is provided with a movable ramp structure which functions as an inlet area control ramp for the subsonic and supersonic speed ranges and has the added function of blocking the primary duct while simultaneously opening a secondary duct, the latter being located in an upper portion of the aircraft to prevent ingestion of surface debris and engine exhaust gases during VTOL operation, with the secondary duct providing the entire air intake for VTOL.

---

The present invention relates to aircraft jet engine installations and specifically to an engine air inlet system for supersonic V/STOL aircraft.

In supersonic jet aircraft the desirable flow characteristics of the engine air inlet at high speed are entirely different from those at low speed. Certain aircraft utilize variable inlets with movable spikes, deflectors, variable ramps, or similar means to adjust the flow to the engines in accordance with the speed of the aircraft. In V/STOL aircraft, which take off and land vertically or with a very short run, engine air inlets in conventional positions are close to the ground and re-ingestion of exhaust gases and ground debris becomes a problem. This can be solved by relocating the air inlet, but a position suitable for V/STOL conditions may not be efficient for supersonic flight.

The primary object of this invention, therefore, is to provide an engine air inlet system which includes a primary inlet direct to the engine for high speed flight and a secondary inlet clear of possible re-ingestion zones for V/STOL operation, the primary inlet incorporating a variable ramp which can be moved to completely close the primary inlet while simultaneously opening the secondary inlet.

Another object of this invention is to provide inlet structure which is adaptable to a variety of aircraft arrangements, the primary inlet being a conventional forward opening type to receive ram air in forward flight and the secondary intake being located in an upper portion of a wing or fuselage.

A further object of this invention is to provide inlet structure wherein the secondary inlet has an outer door to seal the inlet in high speed flight, the door being opened for V/STOL operation and incorporating flow directing means to ensure maximum air intake to the engine.

The inlet structure and its operation are illustrated in the drawings, in which.

Similar characters of reference indicate similar or identical elements and portions throughout the specification and throughout the views of the drawings.

Figure 1:
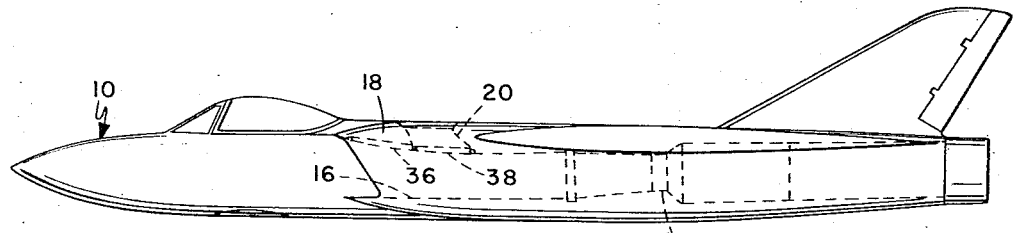
FIGURE 1 is a side elevation view of a typical aircraft incorporating the inlet structure.
Figure 2:
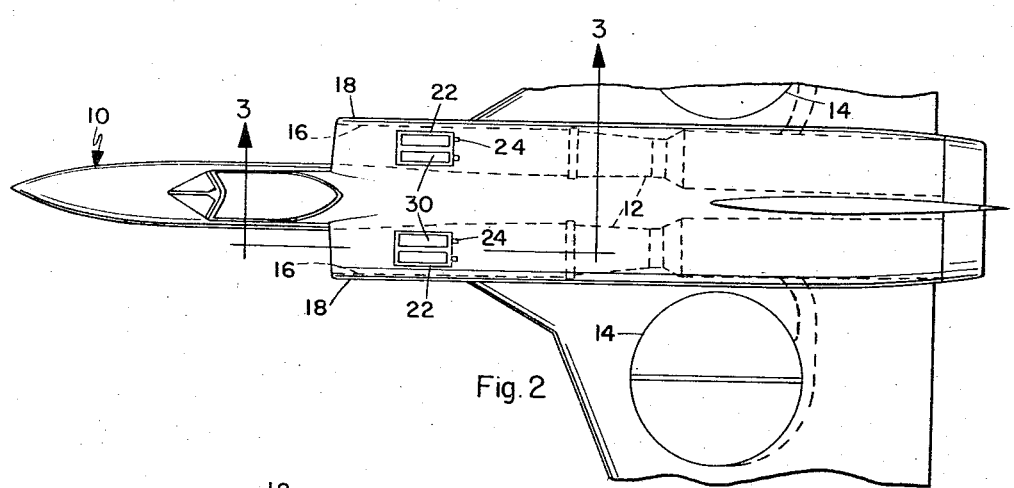
FIGURE 2 is a partial top plan view of the aircraft showing a twin engined arrangement.

The aircraft 10 shown in FIGURES 1 and 2, has a pair of turbojet engines 12 for normal propulsion, the engines being coupled to ducted fan units 14 for vertical lift. The technique is well known and many different arrangements of engines and lift fans can be used. It should be understood that the aircraft is merely an example, the inlet system being adaptable to other types of V/STOL aircraft, such as those using direct jet lift by deflection or movable nozzles, or with tiltable or retractable lift units. In the aircraft shown the engines 12 are side by side in the fuselage and have individual, forwardly opening primary inlet ducts 16 on opposite sides of the fuselage, which has extended cowling portions 18 to enclose the inlet ducts.

The secondary inlet ducts 20 extend from ducts 16 upwardly through the top of cowling portions 18, at suitable locations between the forward end of the primary ducts and the engines 12. In other aircraft configurations the secondary ducts could open at the top surface of a wing, fuselage, or other structure above the primary ducts. The upper end of each duct 20 is covered by a door 22 mounted on a transverse hinge 24 at the rear thereof, so that the door can swing upwardly and rearwardly, the door in closed position forming a portion of the upper surface of cowling portion 18. Each door 22 has an arm 26 connected to an actuator 28 by which the door is opened and closed. In the door 22 are louvers 30 pivotally mounted on longitudinally extending hinges 32, to swing between a closed position flush with the door and an open position substantially perpendicular to the door to expose slots 33, as in FIGURE 5. Any suitable actuating means may be used to operate louvers 30, various mechanisms of appropriate type being well known in aircraft.

The forward upper portion of each primary duct 16 is formed by a ramp 34 having a front panel 36 and a rear panel 38. Front panel 36 is attached at its forward end to a transverse front hinge 40, to swing downwardly and forwardly across the duct, the rear panel 38 being connected to the front panel by a transverse elbow hinge 42, so that the ramp can fold into a V configuration depending from the top of the duct. The rear edge of rear panel 38 has laterally projecting guides 44 which ride in longitudinal tracks 46 along both sides of the top of duct 16. In closed or retracted position the rear panel 38 covers the lower end of secondary duct 20 and slides forward to expose the secondary duct as the ramp is extended. At the front hinge 40 the front panel 36 is provided with an arm 48 connected to an actuator 50 for extending and retracting the ramp 34.

Actuators 28 and 50 may be hydraulic, pneumatic or electrically operated, depending on the services available in the aircraft. The mechanism illustrated is merely an example and other actuating means may be equally suitable.

Just forward of each engine 12 is a small bypass duct 52 extending from duct 16 to the lower exterior of the cowling portion 18, the upper end of said bypass duct having a door flap 54 which operates in conjunction with ramp 34. At supersonic speed it is necessary to bypass a certain amount of the incoming air flow, the technique and sequencing mechanism for accomplishing this as the variable ramp is operated being conventional.

Figure 5:
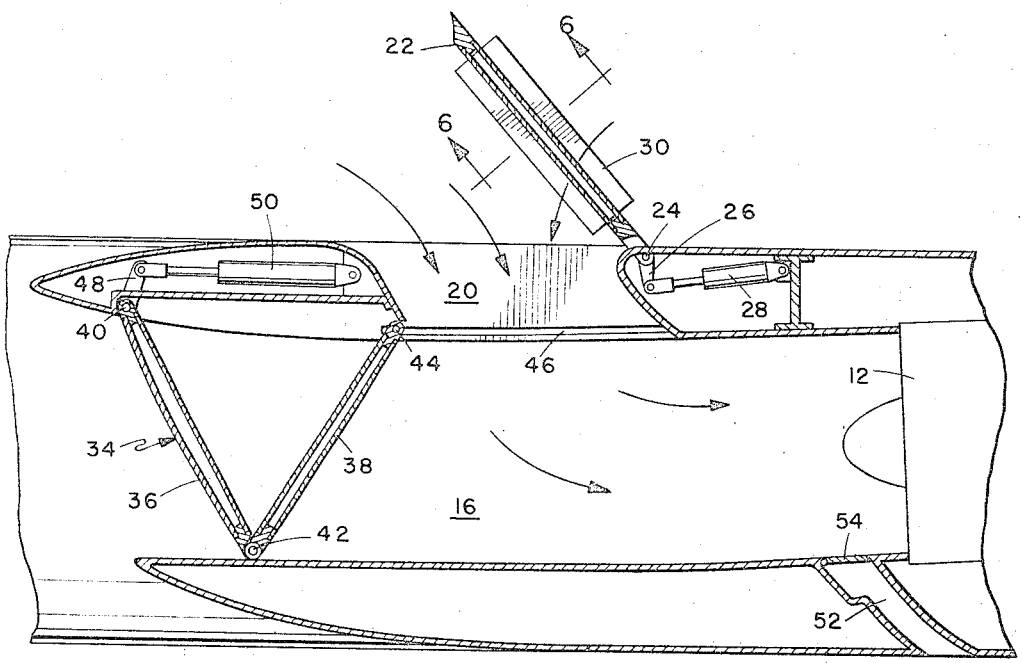
FIGURE 5 is a further sectional view with the inlet system in V/STOL position.
Figure 6:
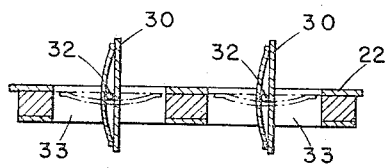
FIGURE 6 is an enlarged sectional view taken on line 6—6 of FIGURE 5.

For a vertical take-off the system is in the position shown in FIGURE 5, with the ramp 34 extended so that the front panel 36 completely blocks the primary inlet duct 16 and door 22 raised to extend upwardly and forwardly, with louvers 30 open. All air for the engine must enter the secondary inlet duct 20, the open louvers 30 allowing air to be captured from behind the door 22 through slots 33 for maximum flow. The location of the inlet duct 20 on top of the aircraft is well clear of exhaust gas and air flow ejected downwardly from the aircraft for vertical lift, and from debris thrown up by the gases. Thus the danger of re-ingestion of combustion gases and consequent reduction in efficiency of the engine is minimized.

After lift-off the aircraft is moved forward by deflecting thrust in a suitable manner, depending on the type of lift system used. In low speed forward flight the engine continues to receive air through the secondary duct 20 and louvers 30 can be closed if necessary to utilize the door 22 as a deflector or scoop to turn the air flow downwardly into the duct. As forward speed increases, with the aircraft clear of ground effect and possible re-ingestion, the ramp 34 can be retracted to open the primary inlet duct 16, while the door 22 is closed.

Figure 3:
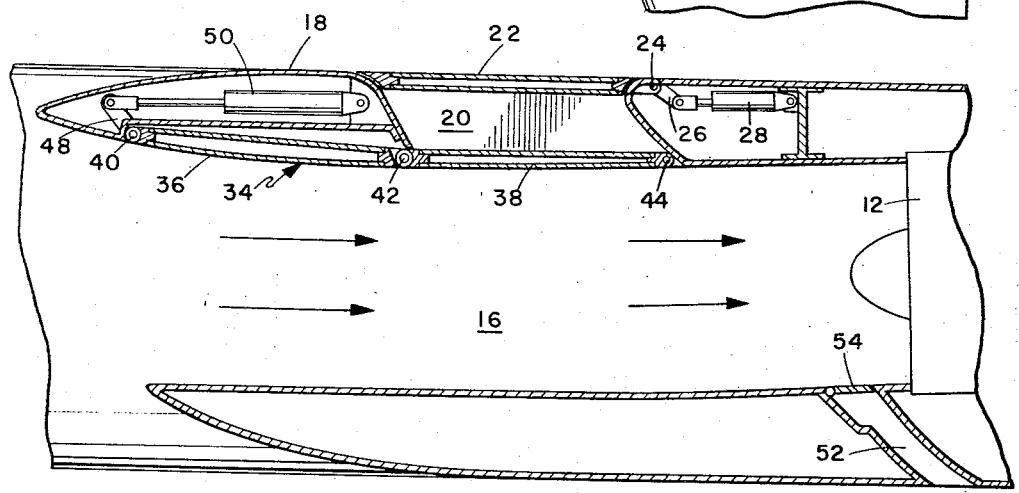
FIGURE 3 is an enlarged sectional view taken on line 3—3 of FIGURE 2, with the inlet system in subsonic cruise position.
Figure 4:
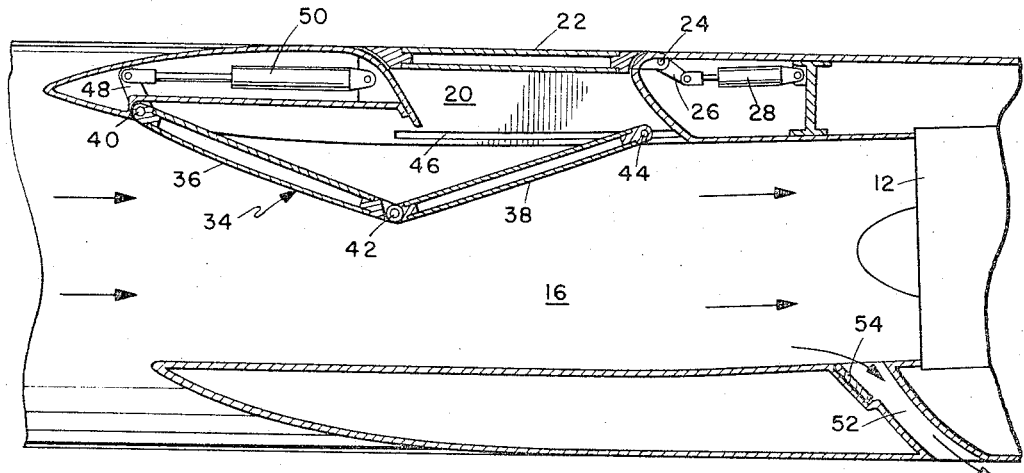
FIGURE 4 is a similar sectional view, but with the inlet system in supersonic cruise position.

In subsonic cruising flight the ramp 34 is fully retracted and door 22 closed to shut off duct 20, as in FIGURE 3, all air flow to the engine being obtained through the fully open primary inlet duct 16.

For supersonic flight the door 22 remains closed, but ramp 34 is partially extended to cause a reduction in the cross sectional area of duct 16. The technique is well known, the ramp being used to set up a shock wave in the duct from the incoming supersonic flow, the flow aft of the ramp restriction being reduced to subsonic velocity before entering the engine. In conventional use the position of the ramp is controlled in accordance with the Mach number to maintain the desired flow characteristics at all speeds. In the supersonic configuration the flap door 54 is also opened to by pass some of the air flow through duct 52.

To make a vertical landing the aircraft's speed is reduced and the propulsion system shifted to the lift condition. The door 22 is opened and ramp 34 extended until, when the aircraft is close to the ground, the inlet duct 16 is completely blocked and duct 20 is open.

Short run take-off is made by using combined propulsion and lift from the engines. Initially the ramp 34 is fully extended, but as the aircraft moves forward and the exhaust gases are left behind, the ramp can be partially retracted to utilize the ram air entering duct 16. Retraction of the ramp and closing of door 22 are continued in a suitable relation until the subsonic cruise position is reached.

By means of the inlet system shown and described the full range of performance, from hovering to supersonic flight, can be accommodated with a minimum of parts and mechanism. The variable ramp has multiple functions encompassing the entire speed range, including blocking the primary inlet against ingestion, controlling the opening of the secondary inlet into the primary duct and providing flow control in the primary duct at supersonic speed.

It is understood that minor variation from the form of the invention disclosed herein may be made without departure from the spirit and scope of the invention, and that the specification and drawings are to be considered as merely illustrative rather than limiting.

I claim:
1. In a V/STOL aircraft having a turbojet engine, an engine air inlet system comprising:
 a forwardly opening primary inlet duct leading to said engine;
 a secondary inlet duct communicating with said primary duct and extending upwardly through a portion of the aircraft structure substantially above the primary duct;
 and variable ramp means in said primary duct, said ramp means being movable selectively to a retracted position substantially within a wall portion of the primary duct for blocking off said secondary duct and an extended position for completely blocking the primary duct and for uncovering said secondary duct and to intermediate positions therebetween.

2. The system according to claim 1 and including a door in the upper end of said secondary duct, said door being movable between a closed position substantially flush with the outer surface structure of the aircraft and an open position extending upwardly and forwardly from the rear of the secondary duct.

3. The system according to claim 1, wherein said ramp means includes a front panel hinged at its forward end to an upper portion of said primary duct to swing downwardly across the duct, a rear panel hinged at its forward end to the rear end of said front panel to fold in a substantially V form therewith, and track means in the upper portion of said primary duct in which the rear end of said rear panel is longitudinally slidable.

4. The system according to claim 3, wherein said track means extends across said secondary duct and said rear panel closes the lower end of the secondary duct when the ramp means is in retracted position.

5. The system according to claim 4 and including a door in the upper end of said secondary duct, said door being hinged at the rear to swing upwardly and expose the secondary duct in an open position and being substantially flush with the outer surface structure of the aircraft in a closed position.

6. The system according to claim 5, wherein said door has slots therein, and louvers in said slots movable between closed and open positions.

References Cited
UNITED STATES PATENTS

| | | | |
|---|---|---|---|
| 2,604,278 | 7/1952 | Johnson | 60—269 X |
| 2,699,906 | 1/1955 | Lee et al. | 60—269 X |
| 3,059,878 | 10/1962 | Kerry et al. | 244—53.8 X |
| 3,109,610 | 11/1963 | Quenzler et al. | 244—53.8 X |

CARLTON R. CROYLE, *Primary Examiner.*